United States Patent [19]

Shaik et al.

[11] Patent Number: 5,127,002
[45] Date of Patent: Jun. 30, 1992

[54] TIME SLOT ASSIGNER FOR USE IN A SERIAL COMMUNICATION SYSTEM

[75] Inventors: Yehuda Shaik, Ramat-Gan; Yoram Yeivin, Petach Tikva; Moti Kurnick, Tel-Aviv, all of Israel

[73] Assignee: Motorola, Inc., Schaumberg, Ill.

[21] Appl. No.: 731,609

[22] Filed: Jul. 17, 1991

[51] Int. Cl.⁵ .......................... H04J 3/02; H04J 3/00
[52] U.S. Cl. .................................. 370/95.1; 370/112;
370/94.1; 370/79; 370/80; 370/82; 370/83
[58] Field of Search ..................... 370/95.1, 112, 94.1,
370/79, 80, 82, 83

[56] References Cited

U.S. PATENT DOCUMENTS

| | | | |
|---|---|---|---|
| 4,704,606 | 11/1987 | Hasley | 340/825.5 |
| 4,771,418 | 9/1988 | Narasimhan et al. | 370/58 |
| 4,777,633 | 11/1988 | Fletcher et al. | 370/50 |
| 4,998,249 | 3/1991 | Bennett et al | 370/112 |

Primary Examiner—Douglas W. Olms
Assistant Examiner—Russell W. Blum
Attorney, Agent, or Firm—Robert L. King

[57] ABSTRACT

A time slot assigner (20) for a serial communication system utilizes an encoded field of data. The time slot assigner (20) has a memory (52) for storing encoded data, a digital counter (60), a prescaler (62), a dedicated latch (58), and a time slot control logic (56). The enclosed data is partitioned into encoded data fields within the memory. A first encoded data field is utilized to indicate a last (LST) encoded data entry of a plurality of entries in the memory to be processed collectively, a second encoded data field (BRS) indicates a bit resolution of the data, a third encoded data field contains a count (CNT) value, and a fourth encoded data field selects a serial communication channel (CSEL). The time slot assigner (20) is activated by an active strobe start cycle signal, and is deactivated in response to a predetermined activated encoded data field.

13 Claims, 3 Drawing Sheets

TIME SLOT ASSIGNER FOR USE IN A SERIAL COMMUNICATION SYSTEM

FIELD OF THE INVENTION

This invention relates generally to serial communication systems, and more particularly, to a time slot assigner for a serial communication system.

BACKGROUND OF THE INVENTION

Every serial communication system utilized for wide area network data communication adheres to a predetermined communication standard. Each communication standard specifies predetermined characteristics of the communicating data. The specified characteristics include, but are not limited to, both a number of data bits called a frame, and communication frequency rate of a communication channel. For example, a typical communication frequency data rate for a communication channel is 64 kbps (64 kilo-bits-per-second). A plurality of sub-communication channels is additionally formed within a larger communication channel by utilizing a time slot for each sub-communication channel. A typical sub-communication channel operates at 8 kbps. A typical frame has 256 bits; other known frames respectively have 512 and 1024 bits. The time slot for each sub-communication channel is repeated on a cyclical basis as controlled by a cycle start strobe signal. A large communication channel that utilizes multiple 64 kbps sub-channels is specified by an ISO "H" channel designation and is also termed a wideband channel.

A problem concerning flexibility of the various communication standards is implementing data communication hardware that interfaces with a variety of communication standards having different bit frequencies, channel bit lengths, and cycle repeat lengths. One approach to interfacing with the variety of communication standards is to have multiple hardware solutions, one for each communication standard. A disadvantage to the above solution is the hardware cost associated with supporting each of the communication standards.

A known solution that permits data having a variable number of bits to be communicated utilizes a memory unit. The memory unit stores channel address for each of a predetermined time frames of communication data. By providing a channel address for each bit time of communication data, a variable number of bits per cycle can be connected to each data communication channel. A problem with having a memory unit store channel address information for each time frame of communicated data is that the memory unit must be sized to accommodate a predetermined maximum cycle length. For a general purpose serial communication system, the amount of required memory is typically both too large and expensive.

Another known solution utilizes a series of preset registers with a dedicated counter for each communication channel. For example, one register determines one of a plurality of allocated time slots for communication, and a separate register determines a number of bits to be communicated. A problem with having a series of preset registers is an inflexibility to support communication variations within a time division multiplexed system.

It is therefore desired to have a cost efficient time division multiplexed serial communication system which is flexible enough to accommodate a variety of communication standards.

SUMMARY OF THE INVENTION

The previously mentioned needs are fulfilled with the present invention. In one form, a time slot assigner and method of operation is provided for use in a serial communication system. The time slot assigner comprises a memory means having an input for receiving encoded data, and a control output for providing a plurality of control signals. The memory means is comprised of a memory data input latch for storing the encoded data. A memory array has an input coupled to the memory data input latch and has an output. The memory array comprises a plurality of frames of encoded data, each frame of encoded data having at least one control bit field. In one form, there are first, second, third, and fourth control bit fields which provide control information. A memory address means is coupled to the memory array for addressing a predetermined portion of the memory array partially in response to the first control bit field. A memory data output latch is coupled to the output of the memory array for storing a predetermined frame of encoded data. A prescaler, a digital counter circuit, and a dedicated latch circuit each have an input coupled to the memory means. The prescaler receives the second control bit field. The digital counter circuit receives the third control bit field, and the dedicated latch circuit receives the fourth control bit field to provide time slot control signals for selecting a data channel for use in communicating the encoded data within the serial communication system.

These and other features, and advantages, will be more clearly understood from the following detailed description taken in conjunction with the accompanying drawings.

DESCRIPTION OF A PREFERRED EMBODIMENT

Figure 1:
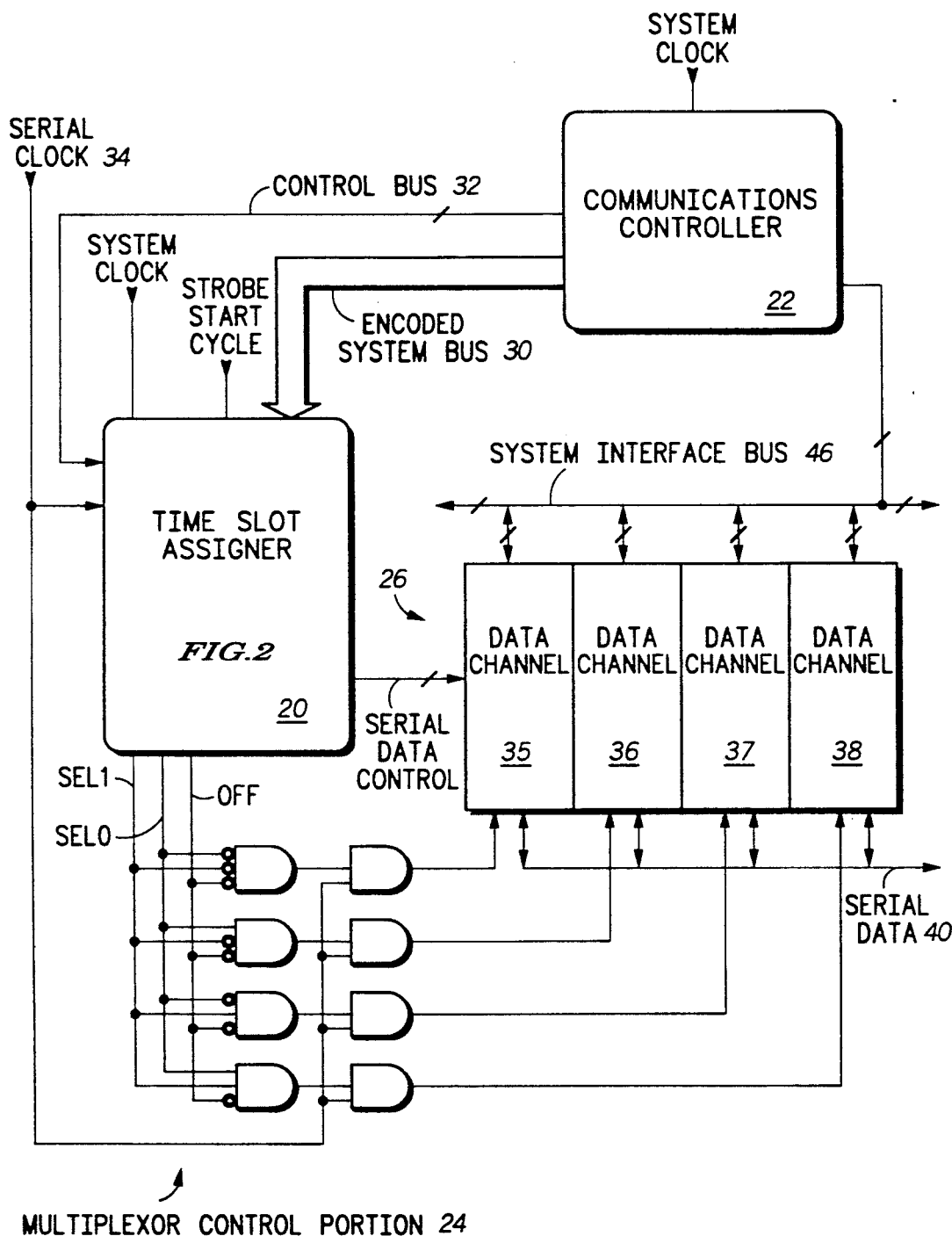
FIG. 1 illustrates in block diagram form a serial communication system in which the present invention is utilized.

FIG. 1 illustrates a serial communication system 10 generally having a time slot assigner 20, a communications controller 22, a multiplexor control portion 24, and a serial data communication portion 26.

The time slot assigner 20 has a data input connected to a data output of the communications controller 22 via an encoded system bus 30, a control input connected to a control output of the communications controller 22 via a control bus 32, an input connected to a source (not illustrated) external to serial communication system 10 to receive a signal labeled "strobe start cycle," a first clock input connected to a source (not illustrated) external to the serial communication system 10 to receive a clock signal labeled "serial clock 34," and a second clock input connected to a source (not illustrated) external to serial communication system 10 to receive a clock signal labeled "system clock." The time slot assigner 20 has a first control output labeled "SEL1," a second control output labeled "SEL0," and a third control output labeled "OFF."

The communications controller 22 will typically contain a data processing unit (not illustrated) along with a shared memory (not illustrated). The encoded system bus 30 is generally a portion of a data bus (not illustrated) associated with the data processing unit within communications controller 22. The communications controller 22 has a clock input connected to the source (not illustrated) external to communication system 10 which provides the system clock signal. The system clock signal is typically a high frequency clock that is utilized for timing control throughout communication system 10.

The multiplexor control portion 24 has a plurality of AND gates. Each of a predetermined number of the AND gates has a predetermined number of inverting inputs, each denoted by a "bubble" on the input as illustrated in FIG. 1. A first portion of the multiplexor control portion 24 has inputs to receive the first, second, and third outputs of the time slot assigner 20. A second portion of the multiplexor control portion 24 has inputs to receive outputs of the first portion of the multiplexor control portion 24 and serial clock 34.

The serial data communication portion 26 has a plurality of serial data channels 35-38. Each serial data channel generally has a serial-to-parallel data interface circuit/parallel-to-serial data interface circuit (not illustrated), and a first-in-first-out memory (not illustrated). Each serial data channel has an input/output connected to the serial data 40 signal via a serial data conductor, and an input/output connected to the system interface bus 46 via a dedicated bidirectional data bus (not labeled). The serial data communication portion 26 is connected to a control output of the time slot assigner 20 via a bus labeled "serial data control" for receiving control information. Although the serial communication system 10 is illustrated with four serial communication channels, a typical serial communication system has additional channels. The illustrated four channel serial communication system 10 is used to demonstrate the present invention.

Figure 2:
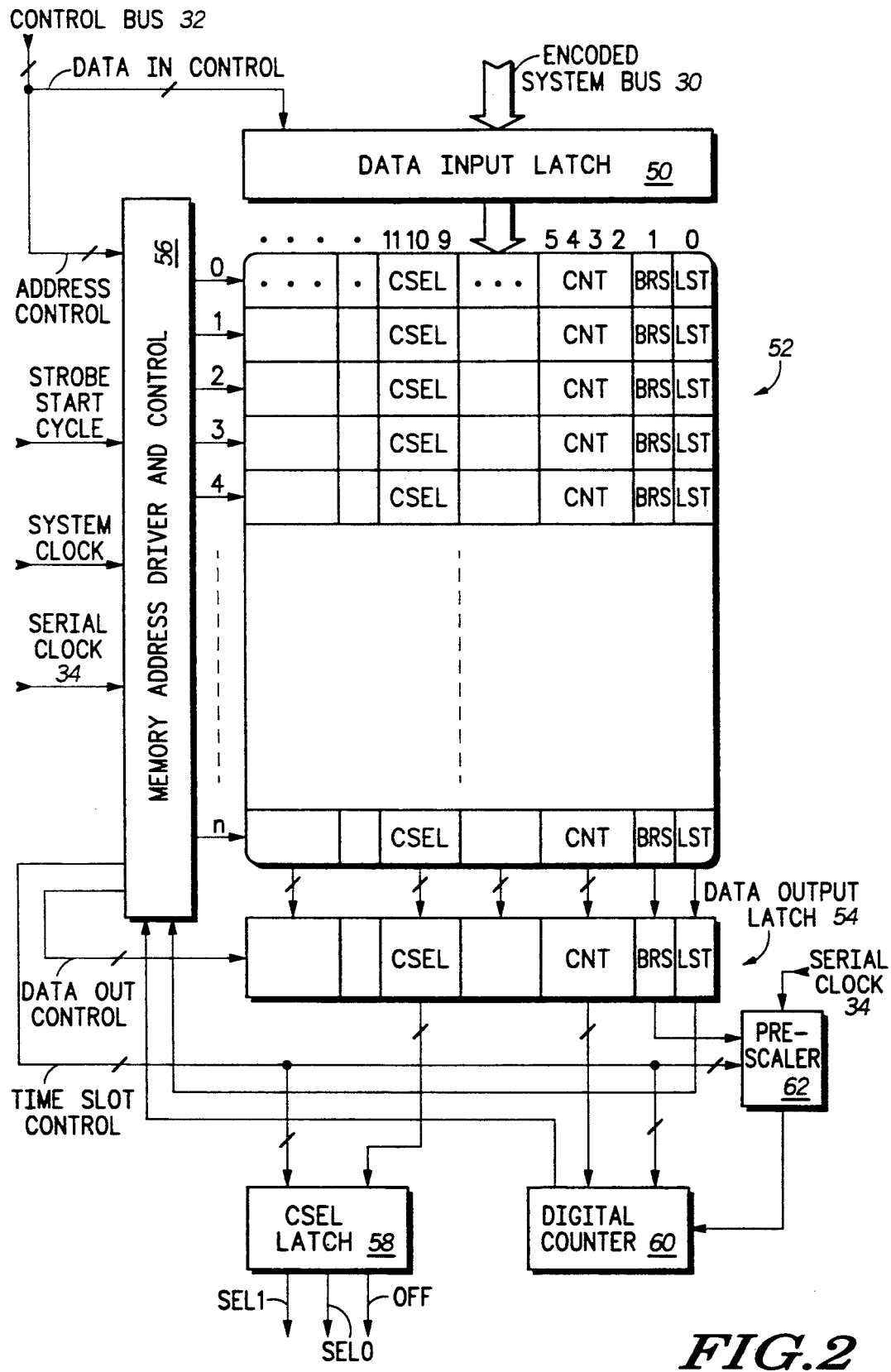
FIG. 2 illustrates in block diagram form a time slot assigner of FIG. 1 in accordance with the present invention.

FIG. 2 illustrates the time slot assigner 20 of FIG. 1. The time slot assigner 20 has a data input latch 50, a memory array portion 52, a data output latch 54, a memory address driver and control portion 56, a channel select (CSEL) latch 58, a digital counter 60, and a prescaler 62. The data input latch 50 has a data input connected to the encoded system bus 30, and a control input connected to control bus 32 via a bus labeled "data in control." The data input latch 50 is connected to a data input of the memory array 52 via a dedicated bus (not labeled). The memory array 52 has a plurality of control inputs, each control input being connected to one of a plurality of control outputs of the memory address driver and control 56 via wires respectively labeled "0, 1, 2, 3, 4 ... n", where n is a predetermined integer. The memory array 52 collectively has a data output connected to a data input of the data output latch 54 via a dedicated data bus (not labeled). The memory array 52 has a predetermined number, (n+1), of rows of memory bits. Each row of memory bits is connected to a predetermined one of the control output signals from the memory address driver and control 56. Bit positions 0-5 and 9-11 of each row of the memory bits are specifically labeled at the top of memory array 52. Each of the rows of memory bits is partitioned into fields of encoded data. In the illustrated example, a first field is located in a bit position zero and is labeled "LST" for last which indicates a last encoded data entry of a plurality of entries in the memory to be processed collectively. A second field is located at bit position one and is labeled "BRS" for bit resolution. A third field is located within bits positions two thru five and is labeled "CNT" for count. and a fourth field is located within bit positions nine thru eleven and is labeled "CSEL" for channel select. Additional bit positions are available for use as needed. The data output latch 54 has a control input connected to a control output of the memory address driver and control 56 via a bus labeled "data out control." The data output latch 54 is partitioned in bit fields identical to the encoded partitioning of each row of memory bits within memory array 52. The memory address driver and control 56 has a strobe input to receive a signal labeled "strobe start cycle," a first clock input to receive serial clock signal 34, a second clock input to receive the system clock signal, and a control input connected to the control bus 32 via a bus labeled "address control." The channel select (CSEL) latch 58 has a data input connected to the CSEL field within the data output latch 54, and a control input connected to an output of the memory address driver and control 56 via a bus labeled "time slot control." The CSEL latch 58 has outputs corresponding to the outputs of the time slot assigner 20 of FIG. 1 discussed previously and respectively labeled SEL1, SEL0, and OFF. The digital counter 60 has a data input connected to the count (CNT) field of the data output latch 54, an input connected to an output of the prescaler 62, a control input connected to the time slot control bus, and an output connected to an input of the memory address driver and control 56. The prescaler 62 has a data input connected to the bit resolution (BRS) field of the data output latch 54, a clock input connected to serial clock 34, and a control input connected to the memory address driver and control 56 via the time slot control bus. The last (LST) field of the data output latch 54 is connected to an input of the memory address driver and control 56. The memory array portion 52 is typically partitioned into regions (not specifically illustrated in FIG. 2). For example, each region may comprise a plurality of rows. A first region contains encoded data for an active receive communication operation, a second region is a shadow for receive data information, a third region contains encoded data for an active transmit communication operation, and a fourth region is a shadow for transmit communication. The discussion below applies to a general communication operation and is applicable to either receiving or transmitting serial data. The shadow regions are provided to enhance communication performance and are not pertinent to the invention.

In operation, the communications controller 22 of FIG. 1 provides a plurality of encoded data via the encoded system bus 30 to the time slot assigner 20. Time slot assigner 20 operates in each of a transmit data mode and a receive data mode. The following discussion is generally applicable to either mode of operation. Each encoded data is selectively latched into a predetermined memory row location within memory array 52 with control provided by the memory address driver and control 56. Serial communication processing commences with an active strobe start cycle signal being provided. The active strobe start cycle signal enables the memory address driver and control 56 to select a first predetermined row of encoded data within the memory array 52. The predetermined first row of encoded data is subsequently latched into the data output latch 54. Fields of encoded data are coupled from the data output latch 54 to predetermined circuits within the time slot assigner (as illustrated). The output signals from the channel select (CSEL) latch 58 are decoded by the multiplexor control portion 24 of FIG. 1. The decoded output of the multiplexor control portion 24 activates a predetermined data channel within serial data communication portion 26. The activated serial data communication channel provides coupling from serial data 40 signal to the system interface bus 46. For example, when serial communication system 10 is receiving data, serial data from serial data 40 signal is stored into a memory portion (not illustrated) of the selectively activated data communication channel. In response to control information received from the time slot assigner 20 via the serial data control bus, the selectively activated data communication channel then couples the serial data to the system interface bus 46 in a parallel manner. When the serial communication system 10 is in a transmit mode of operation, data is latched into the memory portion (not illustrated) of the selectively activated serial data communication channel in a parallel manner from the system interface bus 46. In response to additional control information received via the serial data control bus, the selectively activated serial data control bus serially couples the latched parallel data from the memory portion of the active data channel to serial data 40 signal.

In more detail, the encoded data within the memory array 52 controls the data communicated via serial data 40 signal to a predetermined serial data channel. The data latched in data output latch 54 contains information for a next operation. In the illustrated form, each row of encoded data within memory array 52 contains an LST, a BRS, a CNT, and a CSEL field. The LST field indicates a last data entry in memory array 52. When an active LST field is detected, the memory address driver and control 56 enters an idle state. The active LST field is detected by logic (not illustrated) within memory address driver and control 56. In response to entering the idle state, control 56 "points" to a predetermined first location in memory array 52. In the illustrated example to follow, LST=1 indicates the last entry. The BRS field indicates a bit resolution of data being communicated via serial data 40 signal. For the following example, a BRS logic value of zero indicates bit resolution and a logic value of one indicates byte resolution of the communicated data. The CNT field indicates a count of the number of bits or bytes (as determined by the BRS field) of communicated data. For example, 16 bits of data may be demonstrated by having the BRS field indicate bits and the CNT field equal to 16, or by having the BRS field indicate bytes and the CNT field equal 2. The CSEL field indicates which serial communication channel is selected (i.e. channel select).

Figure 3:
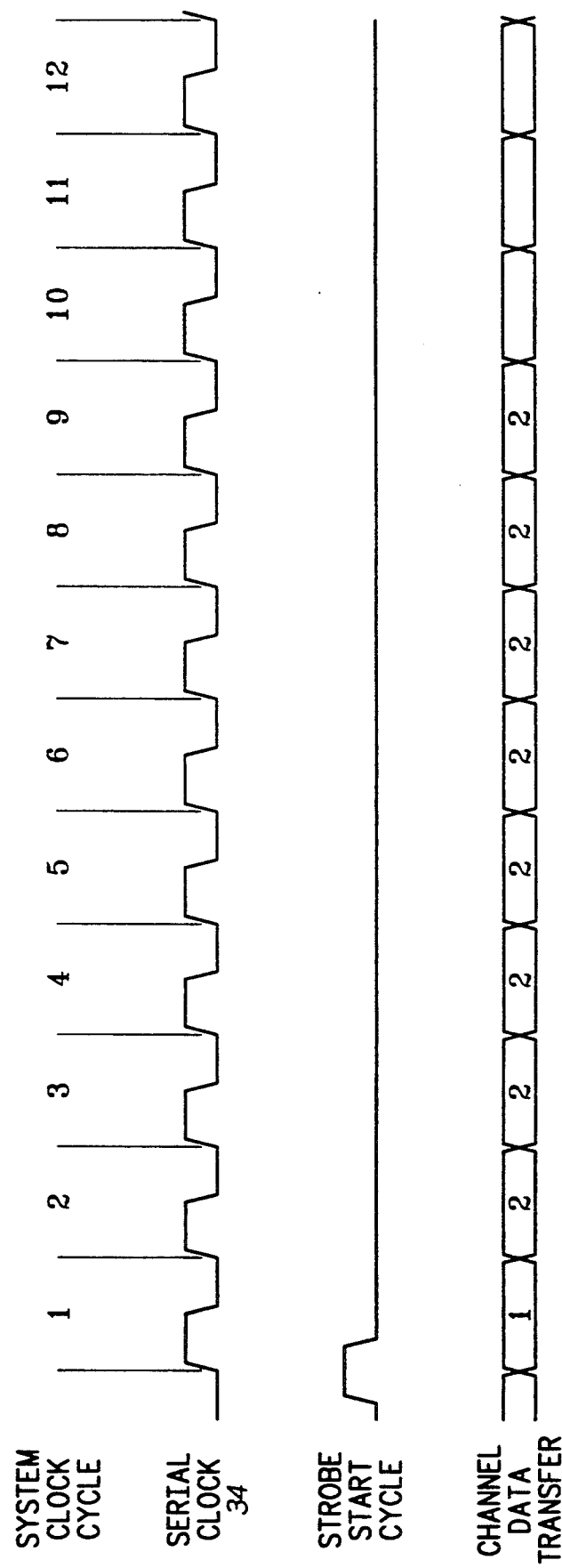
FIG. 3 illustrates in timing diagram form a timing diagram to further illustrate the present invention.

FIG. 3 and table 1 are provided to demonstrate the serial communication system 10. Table 1 illustrates a hypothetical encoded data pattern to be used in conjunction with the timing diagram of FIG. 3.

TABLE 1

| Clock Cycle(s) | *memory location | CSEL | CNT | BRS | LST |
|---|---|---|---|---|---|
| 1 | 0000 | 010 | 001 | 0 | 0 |
| 2-9 | 0001 | 100 | 0001 | 1 | 0 |
| 10 | 0010 | xx1 | 0001 | 0 | 1 |
| ** | don't | don't | don't | don't | don't |

TABLE 1-continued

| Clock Cycle(s) | *memory location | CSEL | CNT | BRS | LST |
|---|---|---|---|---|---|
| | care | care | care | care | care |

*memory location 0000 corresponds to row zero within memory array 52, memory location 0001 corresponds to row one within memory array 52, etc.
**wait for active "strobe start cycle" signal Before the strobe start cycle signal is first asserted, a control signal from the memory address driver and control 56 selectively couples the encoded data from memory location 0000 to data output latch 54. During a first clock cycle time period when the strobe start cycle signal is activated, the encoded data within the data output latch 54 is coupled to predetermined registers. For example, encoded data within the CSEL field is coupled to CSEL latch 58, the encoded data within the CNT field is coupled to the digital counter 60, the encoded BRS field is coupled to the prescaler 62, and the encoded LST field is coupled to the memory address driver and control 56. At the end of the first clock cycle time period, an address pointer (not illustrated) within the memory address driver and control 56 is incremented. In response to the incremented address, encoded data from a predetermined second memory location is selectively coupled to the data output latch 54. Therefore, data output latch 54 functions as a master portion of a master-slave latch, and latch 58, counter 60, and prescaler 62 operate as a slave portion of the master-slave latch. The slave portion contains information for a current execution cycle, and the master portion contains encoded data for a next execution cycle. In response to the encoded data from data output latch 54 of FIG. 2, multiplexor control portion 24 of FIG. 1 selectively activates either one or none of the serial data channels 35-38. For example, table 2 illustrates a typical encoding for the CSEL field where encoded data bits 11 and 10 select a predetermined serial communication channel and data bit 9 is an enabling bit. That is, when the data bit in bit position 9 is active, the encoded data bits in bit positions 11 and 10 are "don't cared" and each output of multiplexor control portion 24 is deactivated.

TABLE 2

| DATA BITS | | | |
|---|---|---|---|
| BIT 11 (SEL1) | BIT 10 (SEL0) | BIT 9 (OFF) | SERIAL CHANNEL |
| 0 | 0 | 0 | 4 |
| 0 | 1 | 0 | 1 |
| 1 | 0 | 0 | 2 |
| 1 | 1 | 0 | 3 |

During an idle state, the CSEL data field at memory location 0000 is latched into data output latch 54. The data at memory location 0000 is 010, which causes serial communication channel one to be activated. Further, at memory location 0000 the CNT field from table 1 indicates a count of one, the BRS field of zero indicates bit resolution, and the LST field is zero to indicate "not a last entry." During a time period that the CSEL data is transferred from the data output latch 54 to the CSEL latch 58, the CNT data is transferred to digital counter 60, the BRS data is transferred to prescaler 62, and the LST data is coupled to the memory address driver and control 56. Since BRS is a zero, prescaler 62 provides a clock input to digital counter 60 that is not divided. As illustrated in FIG. 3, during a first system clock cycle, serial data channel one receives serial data via serial data 40 signal of FIG. 1. Further, during the first system clock cycle, digital counter 60 is decremented and now contains a value of zero. In response to the zero value within digital counter 60, memory address driver and control 56 selects a next encoded data entry within memory array 52 and latches the next encoded entry into data output latch 54. During a second system clock cycle period, latched encoded data within the data output latch 54 is transferred to appropriate destinations, as discussed above. The CSEL field now has a value of 100 which selects serial data channel two. The CNT value is a one, the BRS field has a value of 1, and the LST field is zero. The CNT and BRS values indicate that one byte of data is to be transferred to serial data channel two. As illustrated in FIG. 3, the byte of data is transferred during clock cycles 2-9. Since BRS is a one, prescaler 62 divides the clock input to digital counter 60 by eight. Therefore, after eight clock cycles digital counter 60 has a value of zero. As before, in response to a zero value within digital counter 60 memory address driver and control 56 latches a next encoded data entry within memory array 52 into data output latch 54. The latched encoded data entry, which was located at memory location 0010, has a CSEL value with an activated bit nine, a CNT value of one, a BRS value that indicates bit resolution, and an LST value of one. As discussed above, in response to bit nine being activated each output of the multiplexor control portion 24 is deactivated. Further, since each output of the multiplexor control portion 24 is inactive, each of serial data channels 35-38 is deselected. Since the LST field contains a one, memory address driver and control 56 "points" to the predetermined first memory location in memory array 52, loads the encoded data at the first memory location into data output latch 54, and waits for an active strobe cycle signal.

To summarize, a communications controller 22 of FIG. 1 provides encoded data to a memory array 52 of FIG. 2. Each encoded data entry within memory array 52 has fields of encoded data to select a serial communication channel, determine bit counter resolution, provide a counter value, and indicate a last encoded data entry in memory array 52. Since the data is encoded, a smaller memory array may be utilized to accomplish the identical task when compared to conventional time slot assigners. Further, the encoded data and a minimum use of additional hardware permits flexible serial communication of data in serial communications systems having differing communication protocol standards. In a typical application the memory array 52 has four partitions. Two of the partitions are utilized to receive serial data, and two partitions are utilized to transmit serial data.

It should be well understood that a time slot assigner 20 having encoded data fields stored in a memory array to indicate a last encoded data entry in the memory array, a bit resolution data field, a count value field and a channel select field, is easily expanded to include additional information. For example, an additional field would select a predetermined one of a plurality of strobe signals to be asserted in conjunction with serially communicated data. The strobe signals provide an additional form of communication. In another embodiment, the count field and/or the channel select field would be respectively expanded to accommodate larger count values and/or larger serial communication systems having a large number of serial communication channels. Additionally, encoded fields within the time slot assigner 20 will support a pulse-width-modulation (PWM) form of communication. The PWM communication could be performed concurrently or separately from a time division multiplexed form of communication.

While there have been described herein the principles of the invention, it is to be clearly understood to those skilled in the art that this description is made by way of example and not as a limitation to the scope of the invention. Accordingly, it is intended, by the appended claims, to cover all modifications of the invention which fall within the true spirit and scope of the invention.

We claim:

1. A time slot assigner for use in a serial communication system, the time slot assigner comprising:
    memory means having an input for receiving encoded data, and a control output for providing a plurality of control signals, said memory means being comprised of:
        a memory data input latch for storing the encoded data;
        a memory array having an input coupled to the memory data input latch and having an output, the memory array comprising a plurality of frames of encoded data, each frame of encoded data having first, second, third, and fourth control bit fields which provide control information;
        a memory address means coupled to the memory array for addressing a predetermined portion of the memory array partially in response to the first control bit field; and
        a memory data output latch coupled to the output of the memory array for receiving and providing the control information from the first, second, third, and fourth control bit fields as the plurality of control signals at the control output; and
    a prescaler, a digital counter circuit, and a dedicated latch circuit, each having an input coupled to the memory means, the prescaler receiving the second control bit field and providing a scaled clock signal to the digital counter circuit, the digital counter circuit receiving the third control bit field and providing an address control signal to the memory address means, and the dedicated latch circuit receiving the fourth control bit field, the dedicated latch circuit providing time slot control signals for selecting a data channel for use in communicating the encoded data within the serial communication system.

2. The time slot assigner of the serial communication system of claim 1, wherein the system further comprises:
    a data multiplexor control portion coupled to the dedicated latch circuit and having a control input for receiving the time slot control signals, a clock input for receiving a communications clocking signal, and a plurality of outputs, each output providing a selectively activated output enable signal; and
    a plurality of data channels, each data channel having a control input to receive one of the selectively activated outputs of the data multiplexor control portion, a first data input/output coupled to a serial data conductor, and a second data input/output coupled to a bidirectional data bus.

3. The time slot assigner within the serial communication system of claim 2 wherein the second control bit field is an encoded bit for indicating that data communicated via the serial data conductor has either bit or byte resolution.

4. The time slot assigner within the serial communication system of claim 1 wherein the memory means receives the encoded data from a communications controller.

5. The time slot assigner within the serial communication system of claim 1 further comprising a data multiplexor controller coupled to the time slot control signals and a plurality of data channels wherein one of the plurality of data channels is selected by the data mulitplexor controller and data is communicated between a serial data conductor and a bidirectional data bus.

6. The time slot assigner within the serial communication system of claim 1 wherein the plurality of frames further comprises a first portion of frames of transmit data and a second portion of frames of receive data.

7. The time slot assigner within the serial communication system of claim 1 wherein the first control bit field is an encoded bit for indicating a last frame of the plurality of frames of encoded data in the memory means to be processed as a group of frames by coupling each frame of encoded data to a predetermined one of a plurality of data channels within the serial communication system.

8. A method for time slot assigning serial data in a serial communication system, comprising the steps of:
receiving and storing encoded data in a memory array having a plurality of frames of encoded data, each frame of encoded data having at least one control bit field which provides control information;
addressing a predetermined portion of the memory array partially in response to the at least one control bit field;
storing a predetermined frame of encoded data from the predetermined portion of the memory array in a memory data output latch which is coupled to the output of the memory array; and
using control information within the at least one control bit field of the predetermined frame of encoded data to provide time slot control signals for selecting a data channel for use in communicating the encoded data within the serial communication system.

9. The method of claim 8 further comprising the step of:
receiving the encoded data from a communications controller.

10. The method of claim 9 wherein the step of using control information within the at least one control bit field further comprises:
determining a resolution of the encoded data by determining whether the encoded data has either a bit resolution or a byte resolution in response to a logic state of the at least one control bit field.

11. A time slot assigner for use in a serial communication system, the time slot assigner comprising:
storage means having an input for receiving encoded data, and a control output for providing a plurality of control signals, said storage means being comprised of:
a data input latch for storing the encoded data;
an array having an input coupled to the data input latch and having an output, the array comprising a plurality of frames of encoded data, each frame of encoded data having first, second, third, and fourth control bit fields which provide control information, the first and second control bit fields each being a single bit having a predetermined logic state;
an address means coupled to the array for addressing a predetermined portion of the array partially in response to the first control bit field; and
a data output latch coupled to the output of the array for receiving and providing the control information from the first, second, third, and fourth control bit fields as the plurality of control signals at the control output; and
a prescaler, a digital counter circuit, and a dedicated latch circuit, each having an input coupled to the storage means, the prescaler receiving the second control bit field and providing a scaled clock signal to the digital counter circuit, the digital counter circuit receiving the third control bit field and providing an address control signal to the address means, and the dedicated latch circuit receiving the fourth control bit field, the dedicated latch circuit providing time slot control signals for selecting a data channel for use in communicating the encoded data within the serial communication system.

12. The time slot assigner of the serial communication system of claim 11, wherein the system further comprises:
a data multiplexor control portion coupled to the dedicated latch circuit and having a control input for receiving the time slot control signals, a clock input for receiving a communications clocking signal, and a plurality of outputs, each output providing a selectively activated output enable signal; and
a plurality of data channels, each data channel having a control input to receive one of the selectively activated outputs of the data multiplexor control portion, a first data input/output coupled to a serial data conductor, and a second data input/output coupled to a bidirectional data bus.

13. A time slot assigner circuit for use in a serial communication system having a plurality of data channels, comprising:
a memory array having a plurality of frames of encoded data, each frame of encoded data having at least one control bit field which provides control information, the memory array having an input for receiving and storing encoded data, and an output;
first means coupled to the memory array for addressing a predetermined portion of the memory array partially in response to the at least one control bit field;
a memory data output latch coupled to the output of the memory array for storing a predetermined frame of encoded data from the predetermined portion of the memory array; and
second means coupled to the memory data output latch and the first means, the second means using control information within the at least one control bit field of the predetermined frame of encoded data to control the first means and to provide time slot control signals for selecting one of the plurality of data channels for use in communicating the encoded data within the serial communication system.

* * * * *